Aug. 7, 1956 R. L. COOPER ET AL 2,757,749
STABILIZER MEANS FOR VEHICLES AND THE LIKE
Filed Sept. 22, 1952 3 Sheets-Sheet 1

INVENTORS.
Ray L. Cooper
Edward G. Boxel Jr.
BY
David Manly Heller
Attorney.

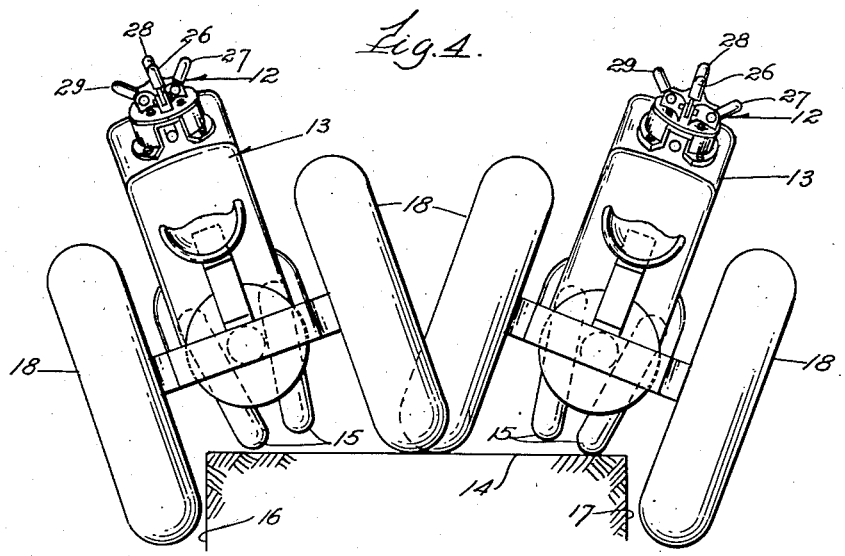

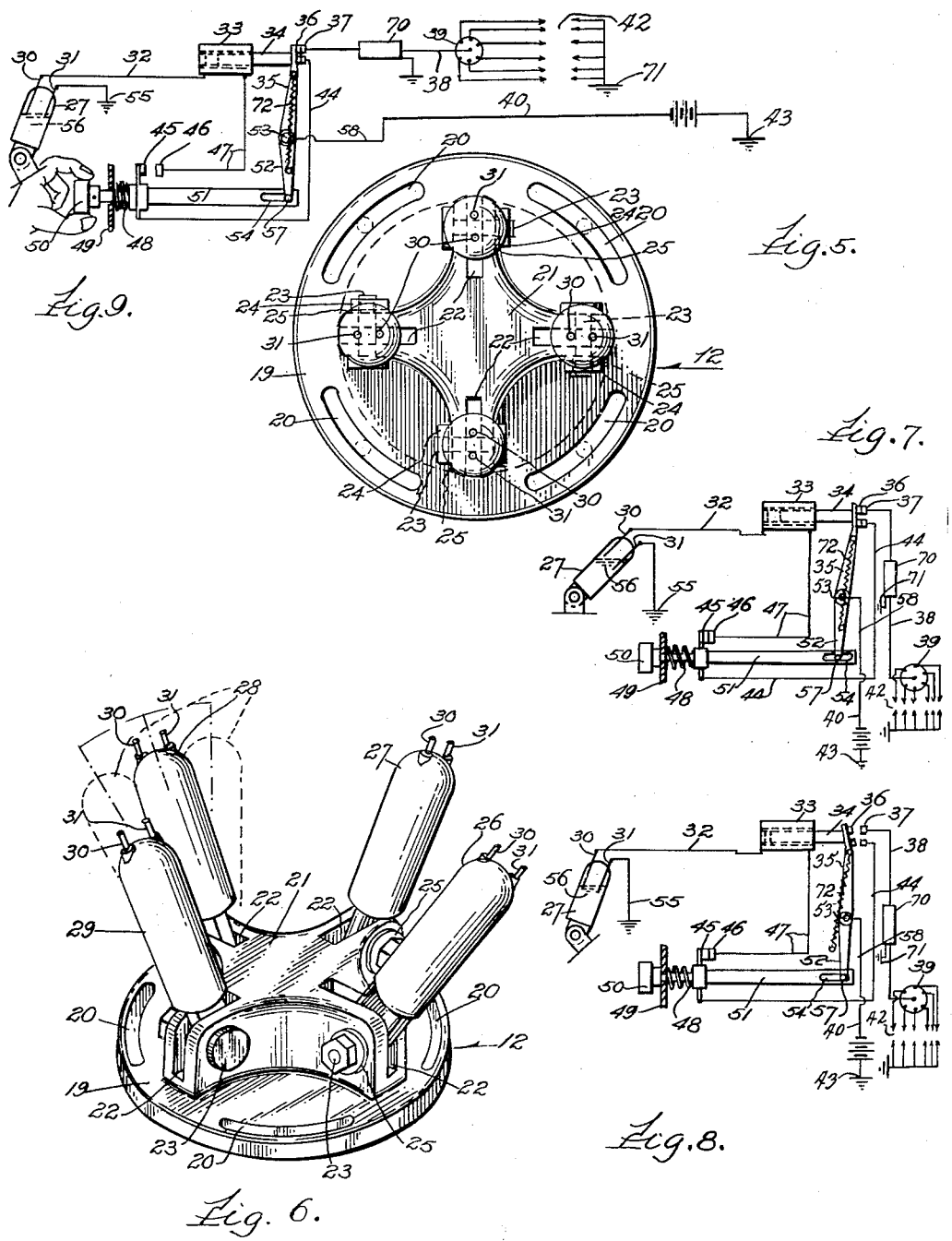

United States Patent Office 2,757,749
Patented Aug. 7, 1956

2,757,749

STABILIZER MEANS FOR VEHICLES AND THE LIKE

Ray L. Cooper and Edward G. Boxel, Jr., Chicago, Ill.

Application September 22, 1952, Serial No. 310,863

4 Claims. (Cl. 180—82)

Our invention relates to universally operable stabilizer switch means to be used in connection with relatively slow moving vehicles, such as tractors and the like.

An important object of our invention is to provide stabilizer switch means of the aforementioned character which may be mounted on the body of a tractor, or vehicle, in suitable position so that it will open the power circuit if the tractor is driven by an ignition controlled engne or prime mover.

Another object of our invention is to provide a device of the aforementioned character which will prevent a vehicle from upsetting forwardly, rearwardly or sidewise, halting the vehicle by disconnecting or opening the power circuit so as to prevent upsetting of the vehicle in any direction.

A further object of our invention is to provide switch means of the aforementioned character which includes a multiple number of mercury switch elements articulately mounted so that they may be adjustably and independently oriented within an ambit of substantially 90 degrees.

A still further object of our invention is to provide electromagnetic solenoid means operating in concert with mechanical switch means, and manually controlled switch means to permit resetting of the ignition system to permit motivating the vehicle from its precarious position prior to upsettng to resume its normal cycle of safe operation.

A still further object of our invention is to provide switch means of the aforementioned character which is simple in construction, effectively operable for the purposes for which it is purported to be used, and switch means of such simple elemental structure as to warrant economical manufacture thereof in quantity production.

Other objects, ancillary advantages, and features resident in our invention will become apparent from an examination of the accompanying drawings, bearing further elucidation in the ensuing description, wherein like symbols are utilized to designate like parts, and in which:

Fig. 4 is a diagrammatic view showing the susceptibility of lateral distortion to which a tractor vehicle equipped wth our invention may be subjected, stopping short of the position wherein its geometric axis will cause it to lose its stability hence preventing upsetting thereof.

Fig. 5 is a top view of the mercury switch assembly means; an important element of our invention.

Fig. 6 is a perspective view thereof.

Fig. 7 is an electrical diagrammatic view showing the switch means connected electrically to permit the vehicle and its prime mover to motivate the same under normal operation.

Fig. 8 is an electrical diagrammatic view similar to Fig. 7 showng the curcuit opened disconnecting the prime mover from operation at a time when the vehicle approaches an abnormal position immediately prior to its upsetting.

Fig. 9 is an electrical diagrammatic view similar to Fig. 8 showing the use of the manual control means for resetting the electrical circuit for resumption of normal operation of the vehicle.

Referring to Figs. 1 to 4, the general objects and attainments of our invention will be expounded and illustrated.

Figure 1:
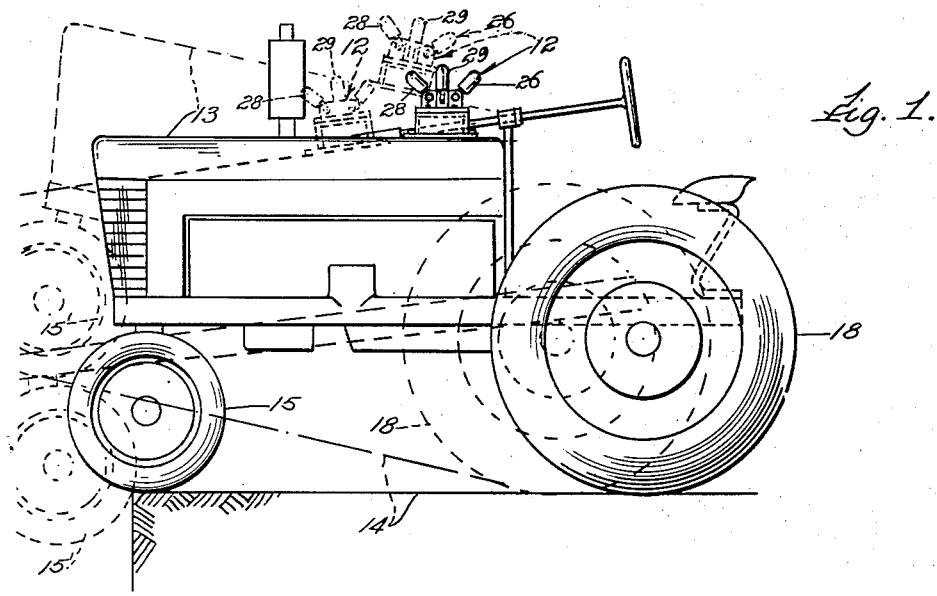
Fig. 1 is a side view of a tractor with our invention mounted thereupon and electrically connected to the prime mover system thereof.
Figure 2:
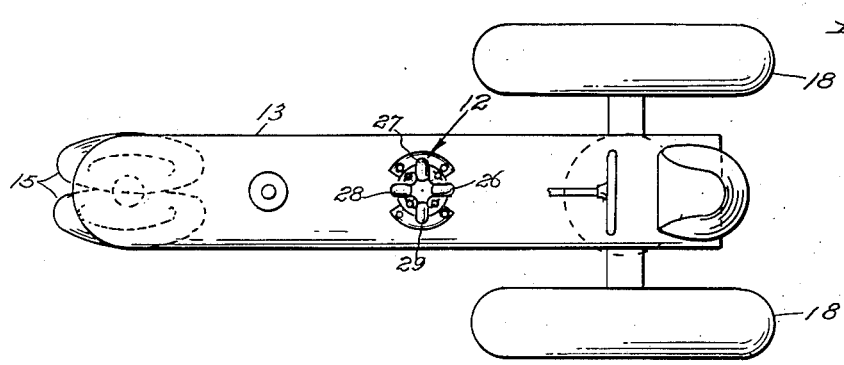
Fig. 2 is a top view of Fig. 1.
Figure 3:
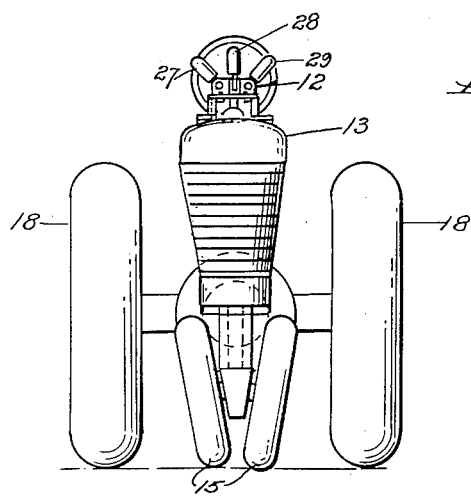
Fig. 3 is an end view looking at the left of Fig. 1.

The tractor vehicle is generally designated 13; our invention attached thereto being generally designated 12; the tractor being equipped with rear wheels 18 and the front guiding wheels 15 operating on a plane horizontal surface 14. In Fig. 1 it will be noted that our invention is mounted in the most strategic position on the vehicle in order to govern displacement thereof from normal position or operation. It will also be noted that the switch means is equipped with north, east, south and west mercury switch elements designated respectively 26, 27, 29 and 28, which will govern the upsetting of the vehicle by shutting off power to the prime mover operating the vehicle, whenever the vehicle should reach a precarious position laterally, or forwardly, or rearwardly with respect to its normal horizontal operation.

In Fig. 1 it will be noted that when the tractor vehicle 13, indicated in full lines, is travelling in a straight line on the surface 14, as indicated in full lines, the stabilizer switch means 12 will occupy a normal horizontal position in which its tubular mercury switch elements 26, 27, 28 and 29 will maintain the mercury level in a position maintaining the circuits thereof open. When the vehicle is mounting an inclination, as indicated by the dotted line 14, then the front forward wheels thereof shown dotted will tend to raise the vehicle, whereby the switch means 12 will also be raised causing one of its tubular elements to close the circuit and thereby energize electromagnetic means as will be hereinafter more clearly explained in order to shut off the power system. Likewise, if the vehicle, as indicated by the dotted lines 15', should pass beyond the edge of the surface 14 whereby the further travel of the vehicle, or its normal operation, would be endangered, then the switch means 12 will be inclined downwardly causing another of its tubular mercury switch elements to close the circuit to de-energize the power motivating system thereof.

In Fig. 4 the lateral displacement of the vehicle when operating on a surface 14 is indicated to the right when one of the rear wheels 18 runs off the horizontal position by running off a cliff 17 or in the left figure, where the left hand rear wheel 18 might displace the tractor 13 from its horizontal position operating off the cliff 16. Thus the rear wheels 18, where most of the weight is concentrated, will govern the stability of the tractor 13 and exert their influence on the universal stabilizer switch means 12, causing it to halt the vehicle from proceeding to a position where the vehicle would be upset.

For further expository reference to the universal stabilizer switch means, the views illustrated and designated Figs. 5 and 6 depict the structural details thereof, in which it will be noted that the switch means, generally designated 12, consists of a disc-like base 19 having a series of arcuate slots 20 for attachment to the body of a tractor vehicle 13. The arcuate slots will permit orientation in a horizontal plane to the most suited positions to be determined after the switch means is attached to the tractor vehicle and operation thereof is observed.

To prevent upsetting of the tractor vehicle 13 a number of mercury switch elements 26, 27, 28 and 29 are provided and are mounted in the hub portion 21 which is provided with slotted portions 22 so that the said switch elements 26, 27, 28 and 29, by virtue of their extensions, may be mounted articulately on the screws 23 and within the slots 22 and held in place firmly in a suitably adjusted angular position by means of the washers 25 and the nuts 24. The mercury switch elements have an approximate ambit of operation of 90 degrees as indicated by the dotted lines in Fig. 6, showing the direction of movement of the mercury switch element 28, all of the remaining mercury switch elements have a similar ambit of motivating adjustment. Each mercury switch element is provided with terminals 30 and 31, and are set in a position whereby the mercury contacting fluid 56 therein will allow one of the terminals to be immersed therein at all times; the other terminal to be out of immersion, thus being in open circuit relationship.

In order to appreciate the operation of our invention, it will be assumed that the same is attached to a tractor vehicle 13 equipped with a prime mover utilizing an ignition system, in which event reference is to be had to the electrical diagrammatic views designated Figs. 7, 8 and 9, showing the cyclical positions of operation.

Referring first to Fig. 7 it will be noted that the switch element 27 has been selected as showing operation whenever it might be tilted to a position to operate the electromagnetic solenoid means 33 in order to open the ignition circuit. It will be noted that the terminal 30 is out of contact, or immersion, with the mercury liquid 56, and the contact 31 is immersed in the mercury liquid 56 and grounded at 55. The terminal 30 is connected through the line 32 to the electromagnetic solenoid 33 provided with a core 34 which is mechanically attached to the switch element 35. The said switch element 35 is pivoted at 53 and is provided with a manipulating extension 52 having an extension portion 57 perpendicular to the extension 52 resting in the slot 54 of the manual control lever 51, operable by the knob 50. The knob 50 rests normally against the abutment 49 and is held normally in position by the spring 48, exerting its pressure on the switch element 45, maintaining a closed circuit with the terminal 46, which forms the other connection to the electromagnetic solenoid 33, through electrical lines 47. The core 34 of the electromagnetic solenoid 33 is actuated to the left to open the circuit whenever the mercury switch element 27 is tilted to position such as that illustrated in Fig. 8, thus opening the circuit between contacts 36 and 37 which close or open the ignition circuit, depending on their position, and which are connected through terminals through electric lines 38 and 44 respectively to the ignition system and also to the manual switch control 45. A high tension coil 70 is interposed between contacts 36 and 37 and distributor 39, the coil 70 being grounded. The distributor is connected at 39 to the electric line 38; the distributor electrical contacts thereof connected through spark plug connections 42 which are grounded at 71, the line 40 being connected to one terminal of the battery 41; the other terminal being grounded at 43, in accordance with conventional practice.

The manually controlled link 51, having the slot 54, provides movement of the switch means 35 and the extension 57 operating therein, so as not to interfere with the actuation of the switch means 35 whenever the electromagnetic solenoid 33 is energized.

It may be preferable to connect an over-center snap spring 72 to the mechanical switch means 35, the operation of which is well known.

In Fig. 8 it will be noted that after tilting of the mercury switch element 27 has occurred, the mercury 56 closes the circuit across the terminals 30 and 31, energizing the electromagnetic solenoid 33, causing its core 34 to be moved to the left which in turn pulls the switch 35 and breaks contacts 36 and 37 to open the ignition circuit and stall the vehicle. As soon as that is accomplished and the vehicle is stalled, the electromagnetic solenoid 33 is de-energized permitting link 51 subsequently to cause the switch 35 to be closed, by virtue of bringing contacts 36 and 37 together and resetting the device for normal operation. In order to set the vehicle into operation, the manual control knob 50 is pulled to the left as indicated in Fig. 9, which, through the agency of the manipulating link 51 and the slot 54, will cause the switch means 35 to close the circuit, at the same time opening the circuit at 45 and 46 and causing the spring 48 to be compressed, ready to exercise its influence to return the manipulating link 51 to its normal position when the knob 50 is released. The knob 50 is held outwardly in order to maintain the ignition circuit closed while the starter is being energized and until the vehicle is backed off its precarious position to be brought back to a horizontal plane when the switch 50 may be released and the vehicle is then prepared to repeat the cycle of operation until the vehicle should once again assume a position which would endanger its stability. The switch means 35 is connected through the line 58 to the electric line 40 in order to bring the contact into the electrical circuit of operation.

In actual operation, Figs. 1 and 4 illustrate the safety features of our invention, wherein it is shown that one of the tubular elements is provided for each of the possible positions of displacement of the vehicle, east, south, north, or west, and any intermediate positions thereof, inasmuch as the elements are so arranged as to have a universally responsive instantaneous action toward preventing the vehicle from becoming upset in any direction.

Although the drawings and the above specification disclose the best modes in which we have contemplated embodying our invention, we desire to be in no way limited to the details of such disclosure, for in the further practical application of our invention many changes in the form and construction thereof may be made as circumstances require or experience suggests without departing from the spirit of the invention as expounded within the scope of the appended claims.

Having thus described and revealed our invention, what we claim as new and desire to secure by Letters Patent is:

1. Stabilizer means to prevent upsetting of a tractor vehicle and the like equipped with a power unit having a primary electrical circuit, comprising a secondary electrical circuit, stabilizer mercury switch means mounted on said tractor vehicle and capable of closing said secondary electrical circuit when said stabilizer mercury switch means tilts from a normal position a predetermined angle in any direction, mechanical switch means articulately mounted and adapted to open and close said primary electrical circuit and provided with an extension having an extension portion, electromagnetic solenoid means attached to said mechanical switch means and adapted to motivate said mechanical switch means to open said primary electrical circuit, said electromagnetic solenoid means being electrically connected to said stabilizer mercury switch means, manually controlled switch means provided with a link having an enlarged slot and attached to said extension portion of said mechanical switch means in order to permit independent actuation of said mechanical switch means to open said primary circuit when said electromagnetic solenoid means is energized, said manually controlled switch means being connected electrically to said electromagnetic solenoid means and to said stabilizer mercury switch means, spring means normally urging said mechanical switch means to maintain said secondary electrical circuit closed, the tilting of said stabilizer mercury switch means opening both said primary electrical circuit and said secondary electrical circuit through the agency of said electromagnetic solenoid means immediately prior to upsetting said vehicle.

2. Stabilizer means to prevent upsetting of a tractor vehicle and the like equipped with a power unit having a primary electrical circuit, comprising a secondary electrical circuit, stabilizer mercury switch means mounted on said tractor vehicle and capable of closing said secondary electrical circuit when said stabilizer mercury switch means tilts from a normal position a predetermined angle in any direction, mechanical switch means articulately mounted and adapted to open and close said primary electrical circuit and provided with an extension having an extension portion, electromagnetic solenoid means attached to said mechanical switch means and adapted to motivate said mechanical switch means to open said primary electrical circuit, said electromagnetic solenoid means being electrically connected to said stabilizer mercury switch means, manually controlled switch means provided with a link having an enlarged slot and attached to said extension portion of said mechanical switch means in order to permit independent actuation of said mechanical switch means to open said primary circuit when said electromagnetic solenoid means is energized, said manually controlled switch means being connected electrically to said electromagnetic solenoid means and to said stabilizer mercury switch means, spring means normally urging said mechanical switch means to maintain said secondary electrical circuit closed, the tilting of said stabilizer mercury switch means opening both said primary electrical circuit and said secondary electrical circuit through the agency of said electromagnetic solenoid means immediately prior to upsetting said vehicle, subsequent opening of said manually controlled switch means causing said mechanical switch means to close said primary electrical circuit simultaneously opening said secondary electrical circuit to permit moving said vehicle away from a precarious position.

3. Stabilizer means to prevent upsetting of a tractor vehicle and the like equipped with a power unit having a primary electrical circuit, comprising a secondary electrical circuit, stabilizer mercury switch means mounted on said tractor vehicle and capable of closing said secondary electrical circuit when said stabilizer mercury switch means tilts from a normal position a predetermined angle in any direction, mechanical switch means articulately mounted and adapted to open and close said primary electrical circuit and provided with an extension having an extension portion, electromagnetic solenoid means attached to said mechanical switch means and adapted to motivate said mechanical switch means to open said primary electrical circuit, said electromagnetic solenoid means being electrically connected to said stabilizer mercury switch means, manually controlled switch means provided with a link having an enlarged slot and attached to said extension portion of said mechanical switch means in order to permit independent actuation of said mechanical switch means to open said primary circuit when said electromagnetic solenoid means is energized, said manually controlled switch means being connected electrically to said electromagnetic solenoid means and to said stabilizer mercury switch means, spring means normally urging said mechanical switch means to maintain said secondary electrical circuit closed, the tilting of said stabilizer mercury switch means opening both said primary electrical circuit and said secondary electrical circuit through the agency of said electromagnetic solenoid means immediately prior to upsetting said vehicle, said stabilizer mercury switch means being provided with a multiplicity of mercury switch elements each mounted in independently adjustable angular relationship.

4. Stabilizer means to prevent upsetting of a tractor vehicle and the like equipped with a power unit having a primary electrical circuit, comprising a secondary electrical circuit, stabilizer mercury switch means mounted on said tractor vehicle and capable of closing said secondary electrical circuit when said stabilizer mercury switch means tilts from a normal position a predetermined angle in any direction, mechanical switch means articulately mounted and adapted to open and close said primary electrical circuit and provided with an extension having an extension portion, electromagnetic solenoid means attached to said mechanical switch means and adapted to motivate said mechanical switch means to open said primary electrical circuit, said electromagnetic solenoid means being electrically connected to said stabilizer mercury switch means, manually controlled switch means provided with a link having an enlarged slot and attached to said extension portion of said mechanical switch means in order to permit independent actuation of said mechanical switch means to open said primary circuit when said electromagnetic solenoid means is energized, said manually controlled switch means being connected electrically to said electromagnetic solenoid means and to said stabilizer mercury switch means, spring means normally urging said mechanical switch means to maintain said secondary electrical circuit closed, the tilting of said stabilizer mercury switch means opening both said primary electrical circuit and said secondary electrical circuit through the agency of said electromagnetic solenoid means immediately prior to upsetting said vehicle, subsequent opening of said manually controlled switch means causing said mechanical switch means to close said primary electrical circuit simultaneously opening said secondary electrical circuit to permit moving said vehicle away from a precarious position, said stabilizer mercury switch means being provided with a multiplicity of mercury switch elements each mounted in independently adjustable angular relationship.

References Cited in the file of this patent

UNITED STATES PATENTS

| Number | Name | Date |
|---|---|---|
| Re. 21,194 | Blanchett | Sept. 5, 1939 |
| 1,858,191 | Hadley et al. | May 10, 1932 |
| 1,956,484 | Bate | Apr. 24, 1934 |
| 2,174,846 | Soulat | Oct. 3, 1939 |
| 2,192,262 | Griesedieck | Mar. 5, 1940 |
| 2,273,058 | Miller | Feb. 17, 1942 |
| 2,296,053 | Porter et al. | Sept. 15, 1942 |
| 2,463,905 | Porton | Mar. 8, 1949 |
| 2,475,963 | Howell | July 12, 1949 |
| 2,619,185 | Rudisill | Nov. 25, 1952 |
| 2,692,652 | Wilson | Oct. 26, 1954 |